United States Patent
Nihanda et al.

(10) Patent No.: US 9,014,938 B2
(45) Date of Patent: Apr. 21, 2015

(54) TRAVEL CONTROL APPARATUS FOR FOUR-WHEEL DRIVE VEHICLE AND TRAVEL CONTROL METHOD FOR FOUR-WHEEL DRIVE VEHICLE

(71) Applicant: Honda Motor Co., Ltd., Tokyo (JP)

(72) Inventors: Norihisa Nihanda, Wako (JP); Takayuki Seki, Wako (JP); Shoichi Ohyagi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/225,427

(22) Filed: Mar. 26, 2014

(65) Prior Publication Data

US 2014/0297145 A1    Oct. 2, 2014

(30) Foreign Application Priority Data

Mar. 29, 2013   (JP) ................................. 2013-072818

(51) Int. Cl.
    *B60K 23/08*      (2006.01)
    *B60W 10/06*      (2006.01)

(52) U.S. Cl.
    CPC ............ *B60K 23/0808* (2013.01); *B60W 10/06* (2013.01)

(58) Field of Classification Search
    None
    See application file for complete search history.

(56) References Cited

U.S. PATENT DOCUMENTS

| 2008/0227598 A1* | 9/2008 | Sigmund ........................ 477/92 |
| 2010/0211248 A1* | 8/2010 | Craig et al. ..................... 701/29 |
| 2010/0332094 A1* | 12/2010 | Wu et al. ......................... 701/69 |
| 2013/0184934 A1* | 7/2013 | Takeuchi et al. ................ 701/37 |

FOREIGN PATENT DOCUMENTS

JP          4368271 B2    3/2006

* cited by examiner

*Primary Examiner* — Justin Holmes
(74) *Attorney, Agent, or Firm* — Mori & Ward, LLP (57) ABSTRACT

A travel control apparatus for a four-wheel drive vehicle includes a throttle controller, a driving force distributor, a four-wheel drive controller, a vehicle stability assist controller, a requested target drive torque calculator, and an estimated drive torque calculator. In a case where a failure detector detects a failure and the four-wheel drive controller changes a drive control from a four-wheel drive control to a two-wheel drive control, the travel control apparatus sends a first throttle control signal to the throttle controller and changes the drive control from the four-wheel drive control to the two-wheel drive control when an estimated drive torque is greater than an requested target drive torque, and the travel control apparatus changes the drive control from the four-wheel drive control to the two-wheel drive control without sending the first throttle control signal when the estimated drive torque is not greater than the requested target drive torque.

5 Claims, 6 Drawing Sheets

TRAVEL CONTROL APPARATUS FOR FOUR-WHEEL DRIVE VEHICLE AND TRAVEL CONTROL METHOD FOR FOUR-WHEEL DRIVE VEHICLE

CROSS-REFERENCE TO RELATED APPLICATIONS

The present application claims priority under 35 U.S.C. §119 to Japanese Patent Application No. 2013-072818, filed Mar. 29, 2013, entitled "Travel Control Apparatus For Four-Wheel Drive Vehicle." The contents of this application are incorporated herein by reference in their entirety.

BACKGROUND

1. Field

The present disclosure relates to a travel control apparatus for a four-wheel drive vehicle and a travel control method for a four-wheel drive vehicle.

2. Description of the Related Art

For example, as disclosed in Japanese Patent No. 4368271, it is known that in a conventional four-wheel drive vehicle, when a failure occurs due to a functional defect of four-wheel drive travel control, the four-wheel drive control is stopped and shifted to two-wheel drive control. When the four-wheel drive control is stopped and shifted to the two-wheel drive control, a large drive torque applied to the wheels may cause unstable behavior of the vehicle. In order to prevent the unstable behavior of the vehicle, the four-wheel drive vehicle disclosed in Japanese Patent No. 4368271 controls a throttle opening such that when the drive torque (target transmission torque) to the rear wheels is greater than or equal to a predetermined value, the throttle opening is reduced and the four-wheel drive control is stopped and shifted to the two-wheel drive control, whereas when the drive torque to the rear wheels is less than the predetermined value, the four-wheel drive control is stopped and shifted to the two-wheel drive control without reducing the throttle opening.

SUMMARY

According to one aspect of the present invention, a travel control apparatus for a four-wheel drive vehicle includes a throttle controller, a driving force distributor, a four-wheel drive controller, a vehicle stability assist controller, a requested target drive torque calculator, and an estimated drive torque calculator. The throttle controller is configured to perform throttle opening control of an engine. The driving force distributor is configured to distribute a driving force generated by the engine to front wheels and rear wheels. The four-wheel drive controller is configured to control the driving force distributor to perform four-wheel drive travel control. The four-wheel drive controller includes a failure detector to detect a failure related to the four-wheel drive travel control. The four-wheel drive controller is configured to change a drive control from the four-wheel drive control to a two-wheel drive control and configured to send a first throttle control signal to the throttle controller to reduce a throttle opening in a case where the failure detector detects a failure. The vehicle stability assist controller is configured to perform vehicle travel control including an operation control of the throttle controller to maintain vehicle travel stability and configured to send a second throttle control signal to the throttle controller to control the throttle opening. The throttle controller is configured to perform the throttle opening control based on a control signal which corresponds to a smaller throttle opening between the first throttle control signal and the second throttle control signal in a case where the first and second throttle control signals are inputted simultaneously. The requested target drive torque calculator is configured to calculate a requested target drive torque to achieve stable travel of the vehicle based on at least a friction limit of the front wheels. The estimated drive torque calculator is configured to calculate an estimated drive torque to estimate the driving force generated by the engine. In a case where the failure detector detects a failure and the four-wheel drive controller changes the drive control from the four-wheel drive control to the two-wheel drive control, the travel control apparatus sends the first throttle control signal to the throttle controller and changes the drive control from the four-wheel drive control to the two-wheel drive control when the estimated drive torque is greater than the requested target drive torque, and the travel control apparatus changes the drive control from the four-wheel drive control to the two-wheel drive control without sending the first throttle control signal when the estimated drive torque is not greater than the requested target drive torque.

According to another aspect of the present invention, in a travel control method for a four-wheel drive vehicle, throttle opening control of an engine is performed. A driving force generated by the engine is distributed to front wheels and rear wheels. A failure related to a four-wheel drive travel control is detected. A drive control is changed from a four-wheel drive control to a two-wheel drive control. A first throttle control signal is sent to reduce a throttle opening in a case where the failure is detected. Vehicle travel control is performed to maintain vehicle travel stability and a second throttle control signal is sent to control the throttle opening. The throttle opening control is performed based on a control signal which corresponds to a smaller throttle opening between the first throttle control signal and the second throttle control signal in a case where the first and second throttle control signals are inputted simultaneously. A requested target drive torque is calculated to achieve stable travel of the vehicle based on at least a friction limit of the front wheels. An estimated drive torque is calculated to estimate the driving force generated by the engine. In a case where the failure is detected and the drive control is changed from the four-wheel drive control to the two-wheel drive control, the first throttle control signal is sent and the drive control is changed from the four-wheel drive control to a two-wheel drive control when the estimated drive torque is greater than the requested target drive torque, and the drive control is changed from the four-wheel drive control to the two-wheel drive control without sending the first throttle control signal when the estimated drive torque is not greater than the requested target drive torque.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

Hereinafter, an embodiment of the present disclosure will be described in detail with reference to the accompanying drawings.

Figure 1:
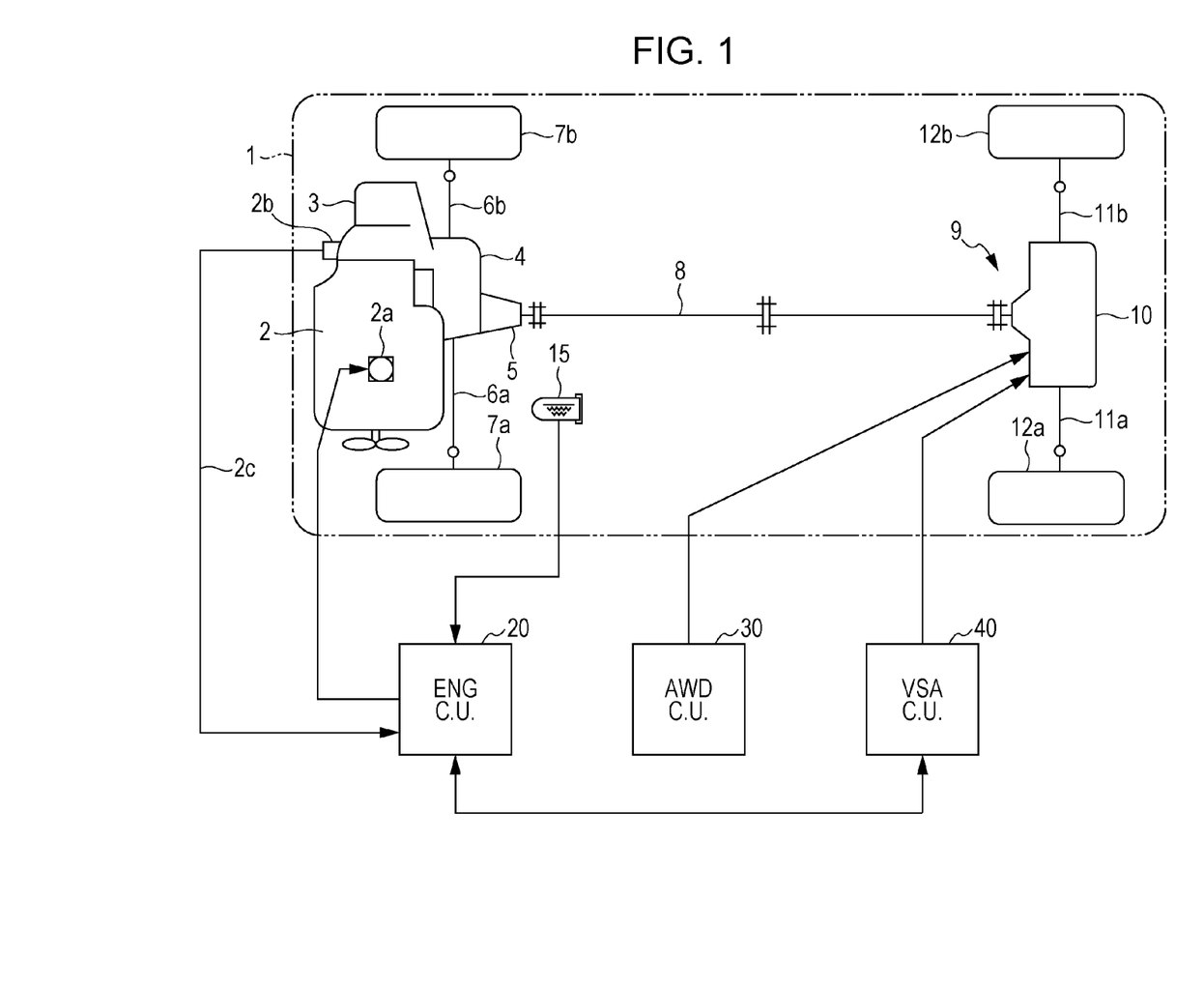
FIG. 1 is a schematic configuration of a four-wheel drive vehicle equipped with a travel control device according to an embodiment of the present disclosure.

FIG. 1 is a schematic configuration of a four-wheel drive vehicle equipped with a travel control device according to the embodiment of the present disclosure. In a vehicle 1 illustrated in FIG. 1, an engine 2 is disposed transversely in the front body, and a transmission 3 is mounted integrally with an output end of the engine 2. In the transmission 3, a front differential mechanism 4 and a transfer mechanism 5 are provided. The driving force of the engine 2, which is changed by the transmission 3, is divided in the front differential mechanism 4 and transmitted to left and right front axle shafts 6a, 6b to drive left and right front wheels 7a, 7b. The above-mentioned engine force is also divided in the transfer mechanism 5 and transmitted to a rear axle device 9 via a propeller shaft 8. The rear axle device 9 has a driving force distribution device 10 by which the driving force is divided into the left and right and transmitted to drive left and right rear wheels 12a, 12b via left and right rear axle shafts 11a, 11b.

The engine 2 is provided with a throttle actuator 2a that controls a throttle opening. The throttle actuator 2a, which has received a throttle control signal from an engine control unit (ENG. C. U.) 20, performs operations for controlling the engine throttle opening. The ENG. C. U. 20 receives a detection signal from an accelerator sensor 15 that detects an amount of operation of the accelerator pedal of the vehicle. The ENG. C. U. 20 performs operation control of the throttle actuator 2a according to the amount of operation of the accelerator pedal. However, the engine throttle opening is controlled by the throttle actuator 2a, and, for this reason, the operation of the throttle actuator 2a may be controlled arbitrarily irrespective of an operation of the accelerator pedal.

The vehicle 1 further has an all-wheel drive control unit (AWD C. U.) 30 which performs four-wheel drive travel control. The AWD C. U. 30 controls the operation of the driving force distribution device 10 by sending control signals thereto, controls the distribution of torque to be transmitted to the front wheels 7a, 7b and the rear wheels 12a, 12b, and controls the distribution of torque to be transmitted to the left and right rear wheels 12a and 12b during turning. In addition, the AWD C. U. 30 is able to control switching between a four-wheel drive travel state (the driving force is constantly transmitted to the left and right front wheels 7a, 7b) and a two-wheel drive travel state, the four-wheel drive travel state enabling transmission of the driving force from the driving force distribution device 10 to the left and right rear wheels 12a, 12b, the two-wheel drive travel state disabling transmission of the driving force to the left and right rear wheels 12a, 12b. It is to be noted that the throttle opening set by an accelerator pedal operation may be controlled and corrected by sending a throttle control signal (the below-described first throttle control signal) from the AWD C. U. 30 to the ENG. C. U. 20.

In addition, the vehicle 1 has a vehicle stability assist control unit (VSA C. U.) 40 which controls the vehicle to maintain its travel stability. The VSA C. U. 40 performs inhibitory control of oversteer associated with an excessive steering operation, inhibitory control of understeer at the time of turning acceleration, start control corresponding to a difference between the road surface conditions for the right and left wheels, and turning brake control for improving the stability at the time of turn braking. Thus, the VSA C. U. 40 receives detection signals from a steering operation sensor, a yaw rate sensor, a lateral acceleration (acceleration in lateral direction) sensor, and a front-rear acceleration (acceleration in front-rear direction) sensor, and sends the detection signals to the driving force distribution device 10. The VSA C. U. 40 also sends an operation control signal to the ENG. C. U. 20 to operate the throttle actuator 2a, and thereby controls the engine throttle, and further controls brake operation on the front and rear, right and left, and thereby controls the vehicle to maintain its travel stability.

The ENG. C. U. 20, the AWD C. U. 30, and the VSA C. U. 40 are connected to each other via a network, and a detection signal inputted to a unit from a sensor is used in common with the units. For example, an engine rotation detection signal detected by an engine rotation sensor 2b mounted on the engine 2 is sent to the ENG. C. U. 20 through a signal line 2c as illustrated in FIG. 1, and the signal is also sent to the AWD C. U. 30 and the VSA C. U. 40 via the network, and is used for respective controls in the units. For this reason, in the case where the engine rotation sensor 2b has a failure or the signal line 2c is disconnected, fail safe control is performed not only in the ENG. C. U. 20, but also in the AWD C. U. 30 and the VSA C. U. 40.

Next, the control of the AWD C. U. 30 will be described with reference to the flow chart of FIG. 2. In the AWD C. U. 30, a target rear transmission torque TTr to be distributed to the rear wheels is first calculated (step S1). Unless a failure caused by a functional defect preventing the four-wheel drive control is detected in step S2, the flow proceeds to step S3, and the operation of the driving force distribution device 10 is controlled so as to transmit the target rear transmission torque TTr to the rear wheels 12a, 12b. It is to be noted that the AWD C. U. 30 has a failure detector that detects a failure related to the four-wheel drive travel control, that is, a failure caused by a functional defect (the detail of the failure will be described below).

Figure 3:
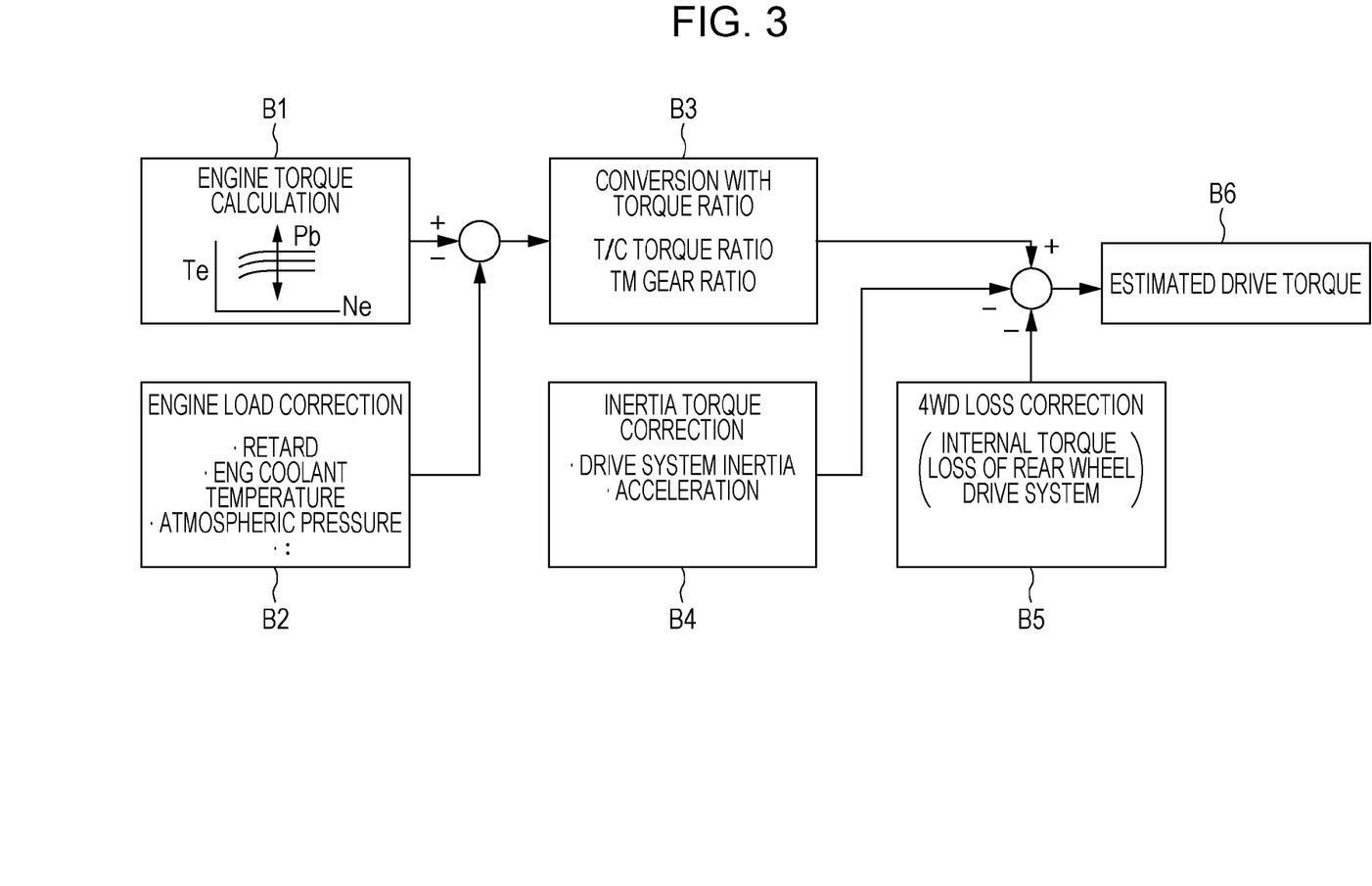
FIG. 3 is a block diagram illustrating a method of calculating an estimated drive torque in the 4WD control.

A method of calculating the target rear transmission torque TTr in step S1 will be described with reference to the block diagrams illustrating in FIGS. 3 and 4. For the calculation, an engine output torque Te is first determined (block B1) from a characteristic map of the engine output based on the relationship between an engine rotation speed Ne and an intake negative pressure Pb. An actual engine output torque Tea is calculated by multiplying the engine output torque Te by a correction coefficient (block B2) according to a retard signal, an engine coolant temperature, an atmospheric pressure, an intake air temperature, the presence of an air conditioner operation, and an engine load such as an alternator load. A transmission output torque Ttm is calculated (block B3) by multiplying the actual engine output torque Tea by a torque ratio of a torque converter and a transmission gear ratio. Further, an amount of correction for inertia torque associated with a rotational fluctuation is calculated (block B4), and an internal torque loss of the rear-wheel drive system is calculated (block B5). By subtracting these amounts from the transmission output torque Ttm, an estimated rear wheel drive torque Test is calculated (block B6). The above processing corresponds to the estimated drive torque calculation unit to calculate an estimated drive torque for estimating a driving force from the engine.

Figure 4:
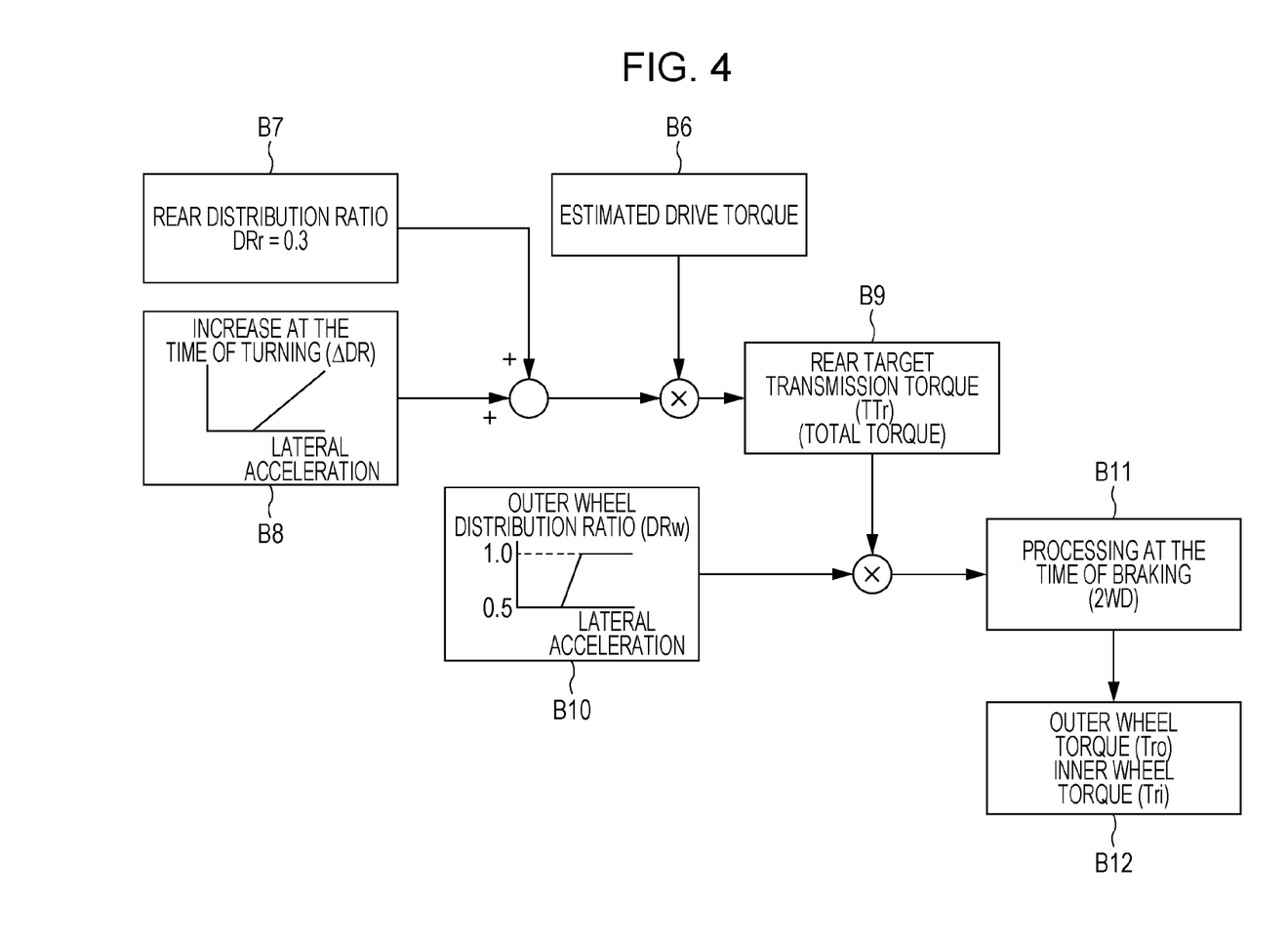
FIG. 4 is a block diagram illustrating a method of calculating a target rear transmission torque in the 4WD control.

Next, referring to the block diagram of FIG. 4, a basic torque distribution ratio DRr (torque distribution ratio between the front and rear wheels) for the rear wheels is read (block B7). It is to be noted that the basic torque distribution ratio DRr is set to an appropriate value according to a vehicle, for example, a predetermined value of 30%. When a vehicle is turning like traveling on a curve, an increase ΔDR of the rear wheel torque distribution ratio is calculated (block B8) according to the magnitude of the acceleration in a lateral direction (lateral acceleration) applied to the vehicle body. The target rear transmission torque TTr to be distributed to the rear side is calculated (block B9) by multiplying the estimated rear wheel drive torque Test calculated in block B6 as described above by the rear wheel torque distribution ratio DR which is obtained by adding the increase ΔDR to the basic torque distribution ratio DRr.

It is to be noted that the target rear transmission torque TTr is the total torque transmitted to the left and right rear wheels 12a, 12b, and for example, when the vehicle is turning, different amounts of torque with a predetermined distribution ratio are transmitted. Thus, a distribution ratio DRw to be distributed to the outer wheel is calculated according to the acceleration of the vehicle body in a lateral direction in block B10. A target transmission torque Tro for the outer rear wheel is calculated by multiplying the target rear transmission torque TTr by the distribution ratio DRw, and a target inner wheel transmission torque Tri is calculated by subtracting the target outer wheel transmission torque Tro from the target rear transmission torque TTr (block B12). However, at the time of braking, transmission of force to the left and right rear wheels 12a, 12b is disabled and anti-lock brake control is activated, and processing for the braking is performed in block B11. That is, at the time of braking, the target outer and inner wheels transmission torques Tro, Tri are both set to zero.

Referring back to FIG. 2, when the target outer and inner wheels transmission torques Tro, Tri are calculated as described above, the AWD C. U. 30 sends a control signal to the driving force distribution device 10 to control its operation to cause those target transmission torques to be transmitted to the left and right rear wheels 12a, 12b (step S3). As a result, distribution of torque transmitted to the front wheels 7a, 7b and the rear wheels 12a, 12b is controlled, and distribution of torque transmitted to the left and right rear wheels 12a, 12b at the time of turning is controlled. As inferred from this distribution control, the driving force distribution device 10 includes left and right clutches which are disposed in a portion thereof connected to, for example, the left and right axle shafts 11a, 11b, and the above-mentioned front and rear wheel torque distribution and left and right wheel torque distribution are performed by controlling engagement of the left and right clutches.

Figure 2:
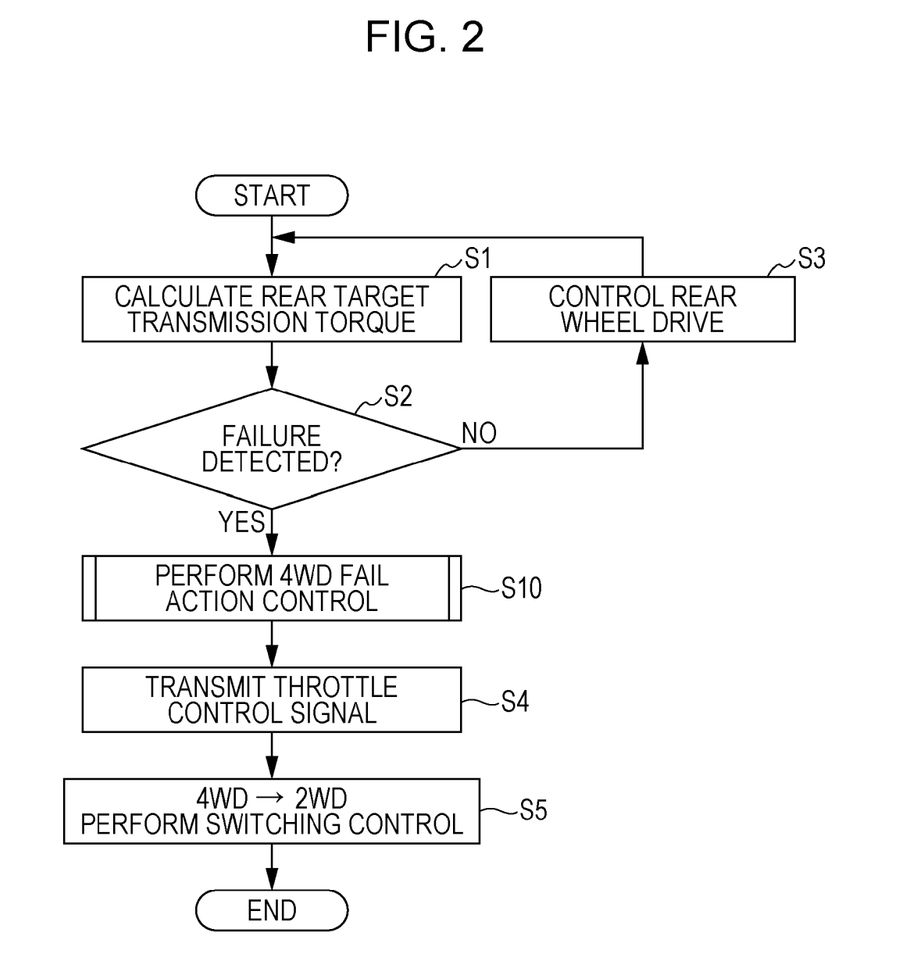
FIG. 2 is a flow chart illustrating 4WD control performed by an all-wheel drive control unit included in the travel control device.
Figure 5:
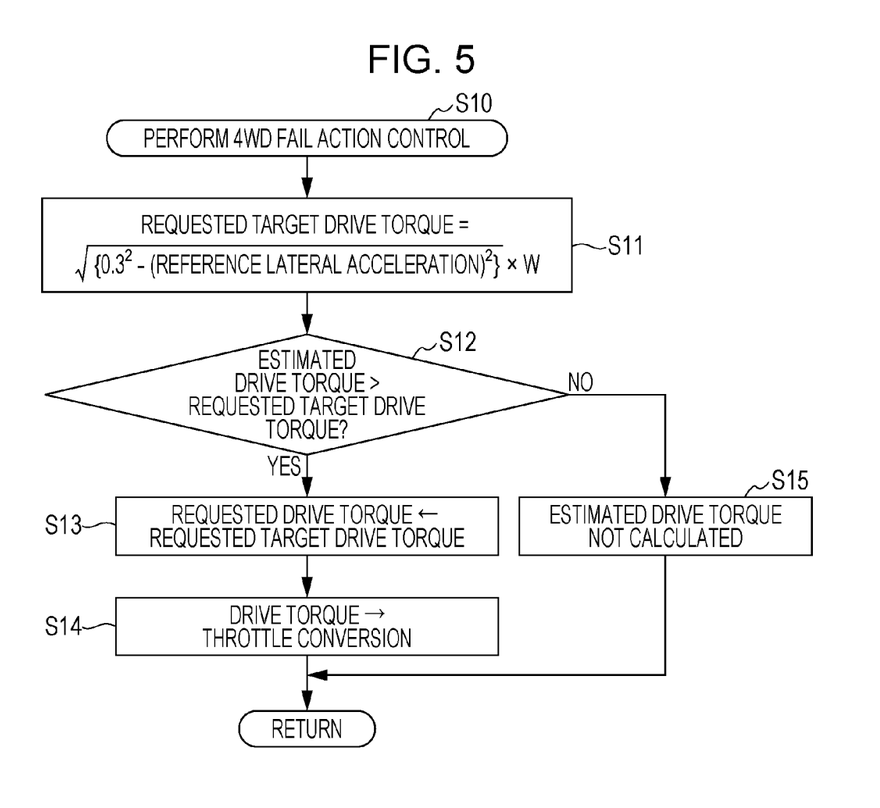
FIG. 5 is a flow chart illustrating 4WD fail action control in the 4WD control.

On the other hand, when a failure caused by a functional defect preventing the four-wheel drive control is detected in step S2, the flow proceeds to step S10 and the 4WD fail action control illustrated in FIG. 5 is performed. A failure caused by a functional defect herein refers to a failure caused by lack of a function which is required in order to perform the above-described front and rear wheel torque distribution and left and right wheel torque distribution, and an example of a failure caused by a functional defect is a failure of an acceleration in lateral direction (lateral acceleration) sensor. In addition, such a functional defect-caused failure includes a failure of a sensor such as engine rotation sensor 2b to detect a parameter value necessary for calculating an estimated drive torque, a failure of a sensor shared by the AWD C. U. 30 and the VSA C. U. 40 via a communication network, and a failure of the driving force distribution device 10.

As illustrated in FIG. 5, in the 4WD fail action control, "requested target drive torque" is calculated by the below expression (step S11). A requested target drive torque indicates a threshold value of drive torque that enables stable travel of the vehicle when the four-wheel drive control is stopped and shifted to the two-wheel drive control at the time of occurrence of a functional defect-caused failure.

$$\text{Requested target drive torque} = \sqrt{\{0.3^2 - (\text{referencelateralacceleration} G)^2\}} \times W$$

In the above expression, the weight W of the vehicle is uniquely determined according to the conditions of the vehicle. A value of "0.3" is a "first parameter" in consideration of the friction limit of the tires. Because it is difficult to estimate the friction coefficient μ of a road surface, the friction limit of the tires is set to "0.3" which corresponds to the friction coefficient μ of a road surface covered with snow. Therefore, even in a situation where the friction coefficient is low such as on a road surface covered with snow, a requested target drive torque enabling stable travel of the vehicle may be obtained.

In the above expression, a reference lateral acceleration (second parameter) is a theoretical lateral acceleration excluding the effect of gravity component. The reference lateral acceleration may be calculated, for example, by multiplying the vehicle speed by the yaw rate (turning angular velocity). Consequently, the reference lateral acceleration is a value according to the conditions (travel states) of the vehicle, including the vehicle speed, a difference as to whether the travel state of the vehicle is straight travel or turning travel, and the amount of turning. It is to be noted that the vehicle speed and the yaw rate may be obtained based on the detection signals of the sensor included in the vehicle 1.

In this manner, the requested target drive torque is calculated based on the friction limit of the tires (the first parameter) and the reference lateral acceleration (the second parameter), and thus the requested target drive torque may be obtained which varies according to the vehicle speed and a difference as to whether the travel state of the vehicle is straight travel or turning travel. The above processing corresponds to the requested target drive torque calculation unit for calculating a requested target drive torque enabling stable travel of the vehicle based on at least the friction limit of the front wheels.

Subsequently, the requested target drive torque calculated in step S11 is compared with the estimated rear wheel drive torque Test calculated in block B6, and whether or not the estimated drive torque Test is greater than the requested target drive torque is determined (step S12). When the estimated drive torque Test is greater than the requested target drive torque, unstable behavior of the vehicle is avoided by controlling and reducing the below-described engine throttle opening. As described above, when the four-wheel drive control is stopped and shifted to the two-wheel drive control, the drive torque transmitted to the rear wheels is reduced to zero, and when the driving force of the front wheels, which has been increased by adding the reduced magnitude of drive torque to the front wheels, exceeds the friction limit of the front wheels, the behavior of the vehicle becomes unstable. However, in step S12, whether the behavior of the vehicle becomes unstable is determined by using the requested target drive torque calculated in step S11 as a threshold value, and thus the friction limit of the front wheels, which varies according to the conditions (travel conditions) of the vehicle, may be handled.

When it is determined that the estimated drive torque Test is greater than the requested target drive torque, (YES in step S12), the requested target drive torque calculated in step S11 is set to the requested drive torque (step S13). Consequently, an optimal drive torque appropriate to the conditions (travel conditions) of the vehicle in consideration of the friction limit of the front wheels may be set as the requested drive torque. A requested value (first throttle control signal) for reducing the engine throttle opening θTH is calculated according to the requested drive torque set in step S13 (step S14).

Figure 6:
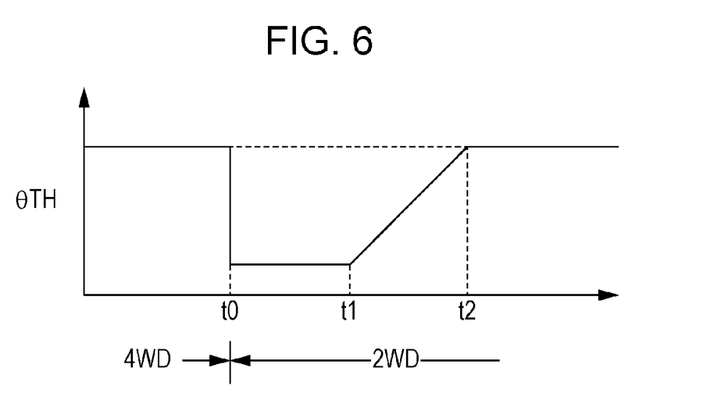
FIG. 6 is a graph illustrating engine throttle opening control requested by the 4WD fail action control.

When the 4WD fail action control (step S10) is performed in the above manner, the flow then proceeds to step S4 of FIG. 2, and the requested throttle opening control signal calculated in step S13 is transmitted to the ENG. C. U. 20. The operation of the driving force distribution device 10 is then controlled in step S5 and the driving force transmission to the rear wheels 12a, 12b is disabled, and a shift is caused from four-wheel drive state to two-wheel drive state. The first throttle control signal sent in step S4 is a control signal such that the signal causes the throttle opening to be reduced to the requested value calculated in step S14, at time $t_0$ when the four-wheel drive state is shifted to the two-wheel drive state as illustrated in FIG. 6, and the reduced throttle opening is maintained for a predetermined time interval (up to time t1), then is gradually returned to the original throttle opening (the throttle opening according to an operation of the accelerator pedal). By this processing, when the drive torque is greater than the requested target drive torque, the following operation is achieved: the first throttle control signal is sent to the throttle control device and the four-wheel drive control is stopped and shifted to the two-wheel drive control. Even in the case where a failure occurs due to a functional defect of the four-wheel drive travel control during a turn, for example, on a road surface with a low friction coefficient such as a snow surface, the drive torque is properly reduced and the behavior of the vehicle may be stabilized.

On the other hand, when the estimated drive torque is less than the requested target drive torque in step S12 of FIG. 5 (NO in step S12), the requested drive torque is not calculated (step S15), the 4WD fail action control is completed (step S10), and the processing proceeds to step S4 and the subsequent steps of FIG. 2. That is, in this case, because the magnitude of the estimated drive torque is at a level which allows a change in travel stability and a change in travel behavior, the first throttle control signal is not calculated. In step S4 of FIG. 2, the flow proceeds to step S5 without the first throttle control signal being transmitted to the ENG. C. U. 20, and the transmission of driving force to the rear wheels 12a, 12b is disabled by controlling the operation of the driving force distribution device 10, then the four-wheel drive state is shifted to the two-wheel drive state. By this processing, when the drive torque is less than the requested target drive torque, the following operation is achieved: the first throttle control signal is not sent and the four-wheel drive control is stopped and shifted to the two-wheel drive control.

As described above, when the first throttle control signal is sent to the ENG. C. U. 20, the ENG. C. U. 20 performs operation control of the throttle actuator 2a so as to set the throttle opening as illustrated in FIG. 6, and a throttle control signal (which is called a second throttle control signal) is sent to the ENG. C. U. 20 also from the VSA C. U. 40 as described above. For this reason, the ENG. C. U. 20 receives two different throttle control signals. The control in this case will be described with reference to FIG. 7.

Figure 7:
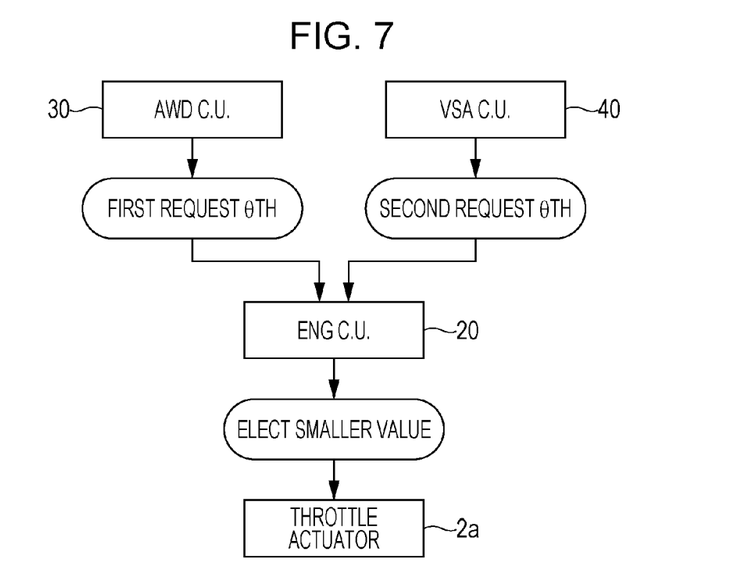
FIG. 7 is a block diagram illustrating the control to be performed when an engine control unit receives different throttle opening control signals from the all-wheel drive control unit and a vehicle stability assist unit.

As illustrated in FIG. 7, when the first throttle control signal is sent from the AWD C. U. 30 to the ENG. C. U. 20 and the second throttle control signal is sent from the VSA C. U. 40 to the ENG. C. U. 20, a smaller one of the first and second throttle control signals is selected in the ENG. C. U. 20. The operation control of the throttle actuator 2a is then performed based on the throttle control signal selected in this manner. Consequently, the engine throttle opening reduction control associated with the shift to the two-wheel drive after the stop of the four-wheel drive control by the AWD C. U. 30 and the engine throttle opening control by the VSA C. U. 40 for stable travel control may be performed, and these controls are for the sake of safety and thus the travel stability is maintained.

Figure 8:
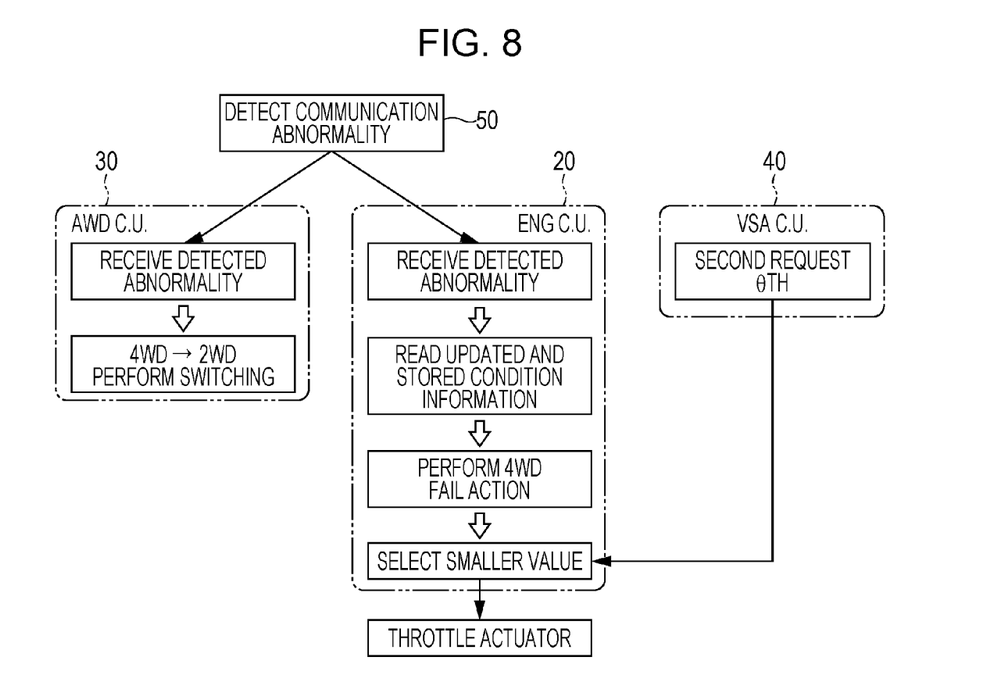
FIG. 8 is a block diagram illustrating the control to be performed on the engine control unit and the all-wheel drive control unit when a communication anomaly between the engine control unit and the all-wheel drive control unit is detected.

Next, another control method according to an embodiment of the present disclosure will be described with reference to FIG. 8. As described above, the ENG. C. U. 20, the AWD C. U. 30, and the VSA C. U. 40 are connected via communication lines to form a network, and share various detection signals used for control. Thus, in the case where an anomaly occurs in the communication lines forming the network, fail safe control specific for each communication line is required. In the AWD C. U. 30, in the case of such an anomaly, particularly, in the case of communication anomaly between the ENG. C. U. 20 and the AWD C. U. 30, the four-wheel drive control is stopped. The fail safe control will be described with reference to FIG. 8 in the following.

First, a communication anomaly detection unit 50 for detecting such a communication anomaly is provided on the network, and for example, when the communication anomaly detection unit 50 detects a communication anomaly between the ENG. C. U. 20 and the AWD C. U. 30, an anomaly detection signal is sent to the ENG. C. U. 20 and the AWD C. U. 30. In addition, the anomaly detection signal is usually sent to the VSA C. U. 40 in many cases.

Upon receiving the anomaly detection signal, the AWD C. U. 30 controls the operation of the driving force distribution device 10 to disable the transmission of driving force to the rear wheels 12a, 12b and to cause a shift from the four-wheel drive state to the two-wheel drive state. At this point, similarly to the above-described case of stopping the four-wheel drive control, reduction control of the engine throttle opening is necessary. However, the first throttle opening signal cannot be sent from the AWD C. U. 30 to the ENG. C. U. 20 because a communication anomaly has occurred between the ENG. C. U. 20 and the AWD C. U. 30.

For this reason, condition information necessary for the 4WD fail action control (the control in step S10 illustrated in FIGS. 2 and 5) by the AWD C. U. 30 has been sent to the ENG. C. U. 20 via a communication line, and is constantly updated and stored in a memory of the ENG. C. U. 20. When a communication anomaly has occurred as described above and an anomaly detection signal is received from the communication anomaly detection unit 50, the AWD C. U. 30 causes a shift from the four-wheel drive state to the two-wheel drive state. On the other hand, the ENG. C. U. 20 reads the newest condition information (that is, the condition information at the time when (immediately before) a communication anomaly has occurred) updated and stored in the memory, and the 4WD fail action control (the control in step S10 illustrated in FIGS. 2 and 5) is performed based on the condition information.

The requested throttle opening control signal (the first throttle control signal) as illustrated in FIG. 6 is thereby obtained, and the operation of the throttle actuator 2a is controlled based on the signal. Consequently, even in the case where a communication anomaly occurs between the ENG. C. U. 20 and the AWD C. U. 30, the engine throttle opening is controlled to be reduced and switching from the four-wheel drive state to the two-wheel drive state is performed.

Thus, in the case where the second throttle control signal has been also sent from the VSA C. U. 40 when the engine throttle opening is reduced, a smaller one of the first and second throttle control signals is selected in the ENG. C. U. 20 for the same reason described above and the operation of the throttle actuator 2a is controlled based on the throttle control signal selected in this manner.

So far, the embodiment of the present disclosure has been described. However, the present disclosure is not limited to the embodiment and various modifications may be made in a scope of the technical concepts described in the claims, the description and the drawings. For example, a calculation method for a reference lateral acceleration, which is used for calculating a requested target drive torque, may be any well-known method. The second parameter is not limited to the reference lateral acceleration, and may be any parameter that indicates whether a travel state of the vehicle is a straight travel state or a turning travel state. The first parameter, which is a numerical value set as a friction limit of the tires, is not limited to "0.3" and may be set to another value.

An embodiment of the present disclosure provides a travel control device for a four-wheel drive vehicle which travels by transmitting an output from an engine to front wheels and rear wheels, the travel control device including: a throttle control device configured to perform throttle opening control of the engine; a driving force distribution device configured to distribute and transmit a driving force from the engine to the front wheels and the rear wheels; a four-wheel drive control device configured to perform four-wheel drive travel control by controlling an operation of the driving force distribution device; and a vehicle stability assist control device configured to control and maintain vehicle travel stability by performing vehicle travel control including an operation control of the throttle control device. The four-wheel drive control device has a failure detection unit to detect a failure related to four-wheel drive travel control, and when a failure is detected by the failure detection unit, the four-wheel drive control device causes the four-wheel drive control to be stopped and shifted to two-wheel drive control and sends a first throttle control signal for reducing a throttle opening to the throttle control device to reduce the throttle opening, the throttle control device is configured to perform throttle opening control based on a control signal which is a smaller one of the first throttle control signal from the four-wheel drive control device and a second throttle control signal for controlling throttle opening sent from the vehicle stability assist control device when the first and second throttle control signals are inputted simultaneously, and the travel control device further includes: a requested target drive torque calculation unit configured to calculate a requested target drive torque for achieving stable travel of the vehicle based on at least a friction limit of the front wheels; and an estimated drive torque calculation unit configured to calculate an estimated drive torque for estimating a driving force from the engine. When a failure is detected by the failure detection unit and the four-wheel drive control is stopped and shifted to the two-wheel drive control by the four-wheel drive control device, the travel control device compares the requested target drive torque calculated by the requested target drive torque calculation unit with the estimated drive torque calculated by the estimated drive torque calculation unit. When the estimated drive torque is greater than the requested target drive torque, the travel control device sends the first throttle control signal to the throttle control device and causes the four-wheel drive control to be stopped and shifted to the two-wheel drive control, and when the estimated drive torque is not greater than the requested target drive torque, the travel control device causes the four-wheel drive control to be stopped and shifted to the two-wheel drive control without sending the first throttle control signal.

With the travel control device for a four-wheel drive vehicle according to the embodiment of the present disclosure, the requested target drive torque calculation unit calculates a requested target drive torque for achieving stable travel of the vehicle based on at least the friction limit of the front wheels, and thus an optimal requested target drive torque may be obtained based on the friction limit of the tires. Because the calculation of the requested target drive torque is based on a theory, the number of steps for setting is reduced. When a failure is detected by the failure detection unit and the four-wheel drive control device causes the four-wheel drive control to be stopped and shifted to the two-wheel drive control, the travel control device compares the optimal requested target drive torque based on the tire friction limit with the estimated drive torque for estimating the driving force of the engine. When the estimated drive torque is greater than the requested target drive torque, the travel control device sends the first throttle control signal to the throttle control device and the four-wheel drive control is stopped and shifted to the two-wheel drive control, and thus a stable travel according to the tire friction limit may be achieved.

In the above-described travel control device, the requested target drive torque calculation unit may be configured to calculate the requested target drive torque based on a first parameter according to the friction limit of the front wheels and a second parameter which indicates whether a travel state of the four-wheel drive vehicle is a straight travel state or a turning travel state. In this manner, the calculated requested target drive torque is changed according to whether the travel state is a straight travel state or a turning travel state, and thus the change of the friction limit of the tires according to a travel state is handled, and thus drivability is improved in the case where a failure occurs due to a functional defect of the four-wheel drive travel control.

Obviously, numerous modifications and variations of the present invention are possible in light of the above teachings. It is therefore to be understood that within the scope of the appended claims, the invention may be practiced otherwise than as specifically described herein.

What is claimed is:

1. A travel control apparatus for a four-wheel drive vehicle, comprising:
    a throttle controller configured to perform throttle opening control of an engine;
    a driving force distributor configured to distribute a driving force generated by the engine to front wheels and rear wheels;
    a four-wheel drive controller configured to control the driving force distributor to perform four-wheel drive travel control, the four-wheel drive controller including a failure detector to detect a failure related to the four-wheel drive travel control, the four-wheel drive controller being configured to change a drive control from the four-wheel drive control to a two-wheel drive control and configured to send a first throttle control signal to the throttle controller to reduce a throttle opening in a case where the failure detector detects a failure;

a vehicle stability assist controller configured to perform vehicle travel control including an operation control of the throttle controller to maintain vehicle travel stability and configured to send a second throttle control signal to the throttle controller to control the throttle opening;

the throttle controller being configured to perform the throttle opening control based on a control signal which corresponds to a smaller throttle opening between the first throttle control signal and the second throttle control signal in a case where the first and second throttle control signals are inputted simultaneously;

a requested target drive torque calculator configured to calculate a requested target drive torque to achieve stable travel of the vehicle based on at least a friction limit of the front wheels;

an estimated drive torque calculator configured to calculate an estimated drive torque to estimate the driving force generated by the engine; and in a case where the failure detector detects a failure and the four-wheel drive controller changes the drive control from the four-wheel drive control to the two-wheel drive control, the travel control apparatus sending the first throttle control signal to the throttle controller and changing the drive control from the four-wheel drive control to the two-wheel drive control when the estimated drive torque is greater than the requested target drive torque, and the travel control apparatus changing the drive control from the four-wheel drive control to the two-wheel drive control without sending the first throttle control signal when the estimated drive torque is not greater than the requested target drive torque.

2. The travel control apparatus for a four-wheel drive vehicle according to claim 1,
wherein the requested target drive torque calculator is configured to calculate the requested target drive torque based on a first parameter according to the friction limit of the front wheels and a second parameter which indicates whether a travel state of the four-wheel drive vehicle is a straight travel state or a turning travel state.

3. The travel control apparatus for a four-wheel drive vehicle according to claim 1,
wherein the failure related to the four-wheel drive travel control includes a failure caused by lack of a function which is required in order to perform a front and rear wheel torque distribution and a left and right wheel torque distribution.

4. A travel control apparatus for a four-wheel drive vehicle, comprising:
throttle control means for performing throttle opening control of an engine;
driving force distributing means for distributing a driving force generated by the engine to front wheels and rear wheels;
four-wheel drive control means for controlling the driving force distributing means to perform four-wheel drive travel control, the four-wheel drive control means including failure detection means for detecting a failure related to the four-wheel drive travel control, the four-wheel drive control means changing a drive control from the four-wheel drive control to a two-wheel drive control and sending a first throttle control signal to the throttle control means to reduce a throttle opening in a case where the failure detection means detects a failure;
vehicle stability assist control means for performing vehicle travel control including an operation control of the throttle control means to maintain vehicle travel stability and for sending a second throttle control signal to the throttle control means to control the throttle opening;
the throttle control means performing the throttle opening control based on a control signal which corresponds to a smaller throttle opening between the first throttle control signal and the second throttle control signal in a case where the first and second throttle control signals are inputted simultaneously;
requested target drive torque calculation means for calculating a requested target drive torque to achieve stable travel of the vehicle based on at least a friction limit of the front wheels;
estimated drive torque calculation means for calculating an estimated drive torque to estimate the driving force generated by the engine; and
in a case where the failure detection means detects a failure and the four-wheel drive control means changes the drive control from the four-wheel drive control to the two-wheel drive control, the travel control apparatus sending the first throttle control signal to the throttle control means and changing the drive control from the four-wheel drive control to a two-wheel drive control when the estimated drive torque is greater than the requested target drive torque, and the travel control apparatus changing the drive control from the four-wheel drive control to the two-wheel drive control without sending the first throttle control signal when the estimated drive torque is not greater than the requested target drive torque.

5. A travel control method for a four-wheel drive vehicle, the method comprising:
performing throttle opening control of an engine;
distributing a driving force generated by the engine to front wheels and rear wheels;
detecting a failure related to a four-wheel drive travel control;
changing a drive control from a four-wheel drive control to a two-wheel drive control;
sending a first throttle control signal to reduce a throttle opening in a case where the failure is detected;
performing vehicle travel control to maintain vehicle travel stability and sending a second throttle control signal to control the throttle opening;
performing the throttle opening control based on a control signal which corresponds to a smaller throttle opening between the first throttle control signal and the second throttle control signal in a case where the first and second throttle control signals are inputted simultaneously;
calculating a requested target drive torque to achieve stable travel of the vehicle based on at least a friction limit of the front wheels;
calculating an estimated drive torque to estimate the driving force generated by the engine; and
in a case where the failure is detected and the drive control is changed from the four-wheel drive control to the two-wheel drive control, sending the first throttle control signal and changing the drive control from the four-wheel drive control to a two-wheel drive control when the estimated drive torque is greater than the requested target drive torque, and changing the drive control from the four-wheel drive control to the two-wheel drive control without sending the first throttle control signal when the estimated drive torque is not greater than the requested target drive torque.

* * * * *